United States Patent [19]

Zietlow

[11] Patent Number: 5,138,937

[45] Date of Patent: Aug. 18, 1992

[54] CONTINUOUSLY VARIABLE ORIFICE EXIT NOZZLE FOR CEREAL GUN PUFFING APPARATUS

[75] Inventor: Douglas A. Zietlow, St. Louis Park, Minn.

[73] Assignee: General Mills, Inc., Minneapolis, Minn.

[21] Appl. No.: 494,067

[22] Filed: Mar. 15, 1990

[51] Int. Cl.⁵ .............................................. A23L 1/18
[52] U.S. Cl. ............................... 99/323.4; 99/471; 99/483; 239/301; 239/394
[58] Field of Search ........................ 99/323.4, 477, 483, 99/516, 473, 494, 471; 239/265.19, 546, 533.13, 265.43, 301, 394

[56] References Cited

U.S. PATENT DOCUMENTS

| | | | |
|---|---|---|---|
| 2,697,485 | 12/1954 | McNally | 239/394 |
| 3,231,387 | 1/1966 | Tsuchiya et al. | |
| 3,272,110 | 9/1966 | Tsuchiya | 99/323.4 |
| 3,291,032 | 12/1966 | Graves | 99/323.4 |
| 3,398,536 | 8/1968 | Stolins | |
| 3,430,643 | 3/1969 | Heiland | 239/301 |
| 3,656,965 | 4/1972 | Strommer et al. | |
| 3,661,071 | 5/1972 | Toei et al. | 99/323.4 |
| 3,701,667 | 10/1972 | Heki et al. | 99/323.4 |
| 3,704,831 | 12/1972 | Clark | 239/394 |
| 3,707,380 | 12/1972 | Dunning et al. | |
| 3,776,470 | 12/1973 | Tsuchiya | |
| 3,971,303 | 7/1976 | Dahl | 99/323.9 |
| 3,972,274 | 8/1976 | Tsuchiya | |
| 4,171,096 | 10/1979 | Welsh et al. | 239/301 |
| 4,265,922 | 5/1981 | Tsuchiya et al. | |
| 4,308,996 | 1/1982 | Rotolico | 239/301 |
| 4,878,422 | 11/1989 | McCullough et al. | 99/471 |

FOREIGN PATENT DOCUMENTS

| | | | |
|---|---|---|---|
| 1378096 | 10/1964 | France | 99/323.4 |
| 2309283 | 11/1976 | France | 239/394 |

*Primary Examiner*—Timothy F. Simone
*Attorney, Agent, or Firm*—John A. O'Toole

[57] ABSTRACT

Disclosed are flow control assemblies such as nozzles and valves for flow control adapted to continuously vary the orifice cross-sectional area. The flow control assemblies have continuously smooth control surfaces to fluid flow and thus are especially suitable for control of heterogeneous fluid streams. The nozzles comprise two concentric, nesting valve flow control members. The assemblies find particular suitability for use as exit nozzles for R-T-E cereal gun puffing apparatus.

6 Claims, 5 Drawing Sheets

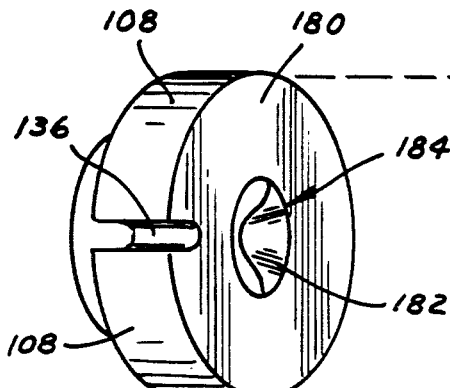
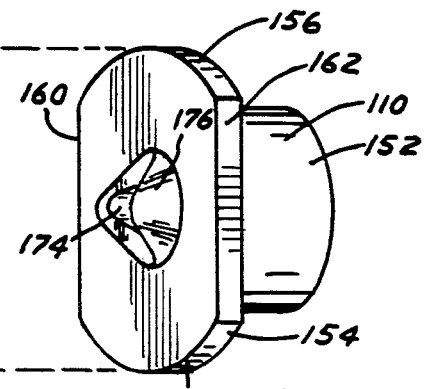
FIG.6  FIG.7
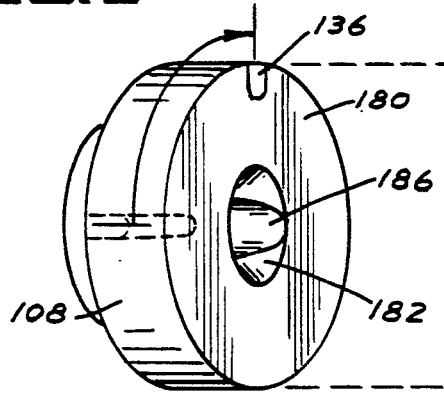
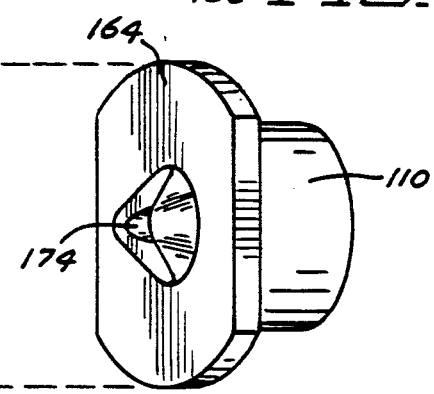
FIG.8  FIG.9
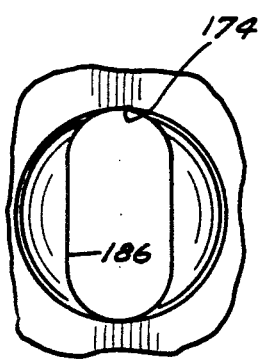
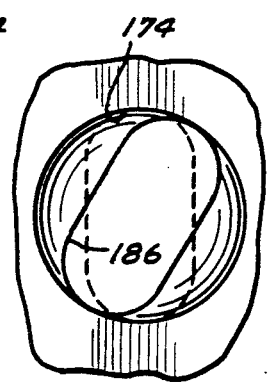
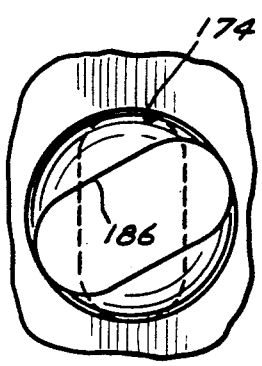
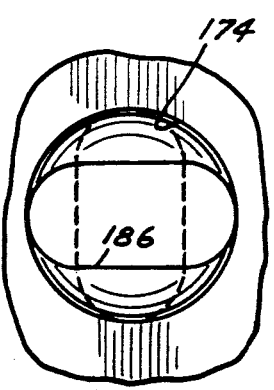
FIG.10  FIG.11  FIG.12  FIG.13

CONTINUOUSLY VARIABLE ORIFICE EXIT NOZZLE FOR CEREAL GUN PUFFING APPARATUS

TECHNICAL FIELD

The present invention relates to a flow control apparatus or nozzle assemblies. More particularly, the present invention relates to a nozzle having a continuously variable orifice cross-sectional area which nozzle finds particular usefulness as a steam/product exit nozzle in the continuous gun puffing of Ready-To-Eat ("R-T-E") cereal products.

BACKGROUND OF THE INVENTION

R-T-E cereals, especially puffed cereals are popular food items. Generally, puffable cereal pellets or grains are puffed in cereal puffing guns by heating under pressure with steam to high temperatures and then being discharged from the gun to a zone of lower pressure. The change in pressure causes an explosive vaporization of the superheated moisture in the pellet which in turn causes the pellet to puff. A variety of such gun puffing apparatus are well known and used by R-T-E cereal processors. For example, a gas heated "C-gun" or continuous puffing gun is described in U.S. Pat. No. 3,656,965, issued to Strommer et al. entitled "Process and Apparatus for Controlling the Expansion of Puffable Materials," which is incorporated herein by reference. Electrically heated guns are also used. (See for example, U.S. Pat. No. 3,972,274, issued to Tsuchiya entitled "Apparatus for Continuously Treating Particulate Material" and U.S. Pat. No. 4,265,922, issued to Tsuchiya et al., May 5, 1981 entitled "Induction Heating Method for Processing Food Material").

The continuous puffing guns in commercial operations generally employ a fixed orifice exit nozzle. Fixed orifice nozzles are used due to the ruggedness and simplicity with which a fixed orifice area nozzle can be constructed.

The exit nozzle orifice cross-sectional area, hereafter called the nozzle orifice area, is an important process variable in the operation of continuous puffing guns because this area ultimately determines the range of pellet feed rates that can be processed as well as other important process operating aspects.

To operate the gun and produce a satisfactory puffed product, the steam flowing through the gun must supply the appropriate amount of heat to the pellets. If too little heat is supplied, the final product moisture will be high, causing the bulk product density to be high, and/or the steam may condense, causing the gun to stop operating. If too much heat is supplied, the product moisture will be low, causing the product to fracture and creating large amounts of fine product waste. The amount of heat supplied to the pellets by the steam depends on the steam enthalpy and the steam flowrate.

The steam enthalpy is a function of the steam temperature and pressure. However, the steam temperature is the primary controlling variable for the steam enthalpy because the effect of the steam temperature on the steam enthalpy is much greater than that of the steam pressure. Consequently, at a given steam flowrate, the heat supplied to the pellets can be controlled by the steam temperature within the operating limits of the steam superheater. Control over the amount of heat necessary to process the pellets throughout the total operating range of continuous guns is not obtainable by controllably varying the steam enthalpy alone. Therefore, the steam flowrate must also be varied over the total operating range of continuous guns.

The steam flowrate is a function of the steam temperature, steam pressure and nozzle orifice area. However, because the steam temperature is the primary controlling variable for the steam enthalpy, and because the steam temperature has only a minor effect on the steam flowrate, the steam temperature is not a practical controlling variable for the steam flowrate. Likewise, the steam pressure cannot be used to independently control the steam flowrate, because it is the primary controlling variable for the puffed product size. Consequently, the only variable that can independently control the steam flowrate is the nozzle orifice area.

As already mentioned, however, the nozzle orifice area is essentially fixed because production must be interrupted to change the nozzle. Hence, the continuous puffing guns have limited operational flexibility. In addition, an optimal nozzle size exists for any given pellet feedrate. Since the nozzle size is fixed, a compromise size, which is usually suboptimal, is chosen. Moreover, employing a fixed orifice area nozzle does not allow the gun to be adjusted for minimal energy usage. Thus, the disadvantages of fixed orifice nozzles include product L variability, suboptimal quality, operational inflexibility and excess energy usage.

Accordingly, a nozzle that continuously adjusts the orifice area thereby is capable in turn of controlling the steam flowrate which control could improve product quality, increase operational flexibility and minimize energy usage.

A variety of exit nozzles of adjustable orifice area have been developed for food processing apparatus that involve heat treatment with high pressure steam. For example, several exit nozzles are known which had been developed for protein texturization apparatus (see, for example, U.S. Pat. No. 3,707,380, issued Dec. 26, 1972 and in particular U.S. Pat. No. 3,776,470, issued Dec. 4, 1973 each to T. Tsuchiya entitled "Variable Nozzle"). While useful in connection with protein texturization processes, these nozzles are unsuitable for use as exit nozzles for continuous cereal puffing apparatus for two reasons. First, in terms of functionality, the known nozzles are primarily adapted to open and close momentarily (although they do not close completely) rather than continuously controlling the orifice cross-sectional area over a small range of areas. Second, these nozzles are insufficiently rugged to withstand the rigors of use in connection with a commercial scale continuous gun puffing apparatus.

It is to be appreciated that commercially useful exit nozzles must be extremely rugged and durable. The nozzles must be designed to withstand the shock waves created as the steam exits the apparatus at supersonic velocities. The shock waves are caused by the exiting steam traveling at supersonic velocity. Useful devices must be designed so as not to fail from metal fatigue or from physical wear.

The prior art additionally includes a number of variable nozzles designed to operate in a hostile environment, especially those developed for rocket engines. In particular, a nozzle described in U.S. Pat. No. 3,398,536 (issued Aug. 27, 1968 to A. B. Stolins, Jr., entitled "Fluid Flow Nozzle Having Temperature Compensating Means") employs two nozzle pieces with eccentric cylinders to create a nozzle with the proper orifice area.

However, nozzles of this design are not suitable for use as an exit nozzle for cereal puffing apparatus. The nozzle design of the '536 patent includes a mating surface between the two valve control pieces which is normal, i.e., perpendicular to fluid flow, which configuration can damage the cereal product as it passes through the nozzle even in a fully open position. Of course, whether the structure comprises a valve (i.e., reduction of the orifice area to zero) or a nozzle (i.e., a reduction of the orifice area to a size greater than zero) depends upon minor differences in the shape of the eccentric bore size and shape. Moreover, the nozzle while variable is not continuously variable but remains fixed once the orifice opening is fixed.

Given the state of the art, there is a continuing need for new and useful exit nozzles for cereal puffing apparatus. Accordingly, it is an object of the present invention to provide an exit nozzle capable of continuously varying the orifice cross-sectional area.

It is another object of the present invention to provide an exit nozzle of simplified design having few moving parts.

Still another object of the present invention is to develop an exit nozzle of enhanced durability.

Still another object of the present invention is to provide an exit nozzle readily adaptable to automatic control.

Still another object of the present invention is to provide an exit nozzle having self-cleaning, smooth internal surfaces.

Still another object of the present invention is to provide an exit nozzle that does not have an internal control surface at right angles to fluid flow so as to provide a nozzle having a reduced potential to damage fluids flowing therethrough.

Surprisingly, the above objectives can be realized and superior nozzles and valves can be fabricated by structure designs having valve mating confronting surfaces at other than a plane at 90° to fluid flow, e.g., a 45° cone or parabola.

Additional objects and advantages of the present invention are described in detail below.

BRIEF DESCRIPTION OF THE DRAWINGS

FIG. 5 is a cross-sectional view of a portion of the inner nozzle assembly showing one valve control member and a plan view of that valve portion.

FIG. 6 is an enlarged broken perspective view of the nozzle pieces shown.

FIG. 7 is an enlarged broken perspective view of the second nozzle piece.

FIGS. 8 and 9 are views similar to FIG. 6 but with the outer adjustable nozzle piece rotated 90° to an enlarged position.

FIGS. 10-13 are simplified schematic depictions of an orifice area as the nozzle flow control members rotate from a fully open to a maximally restricted position.

DESCRIPTION OF THE PREFERRED EMBODIMENTS

Figure 1:
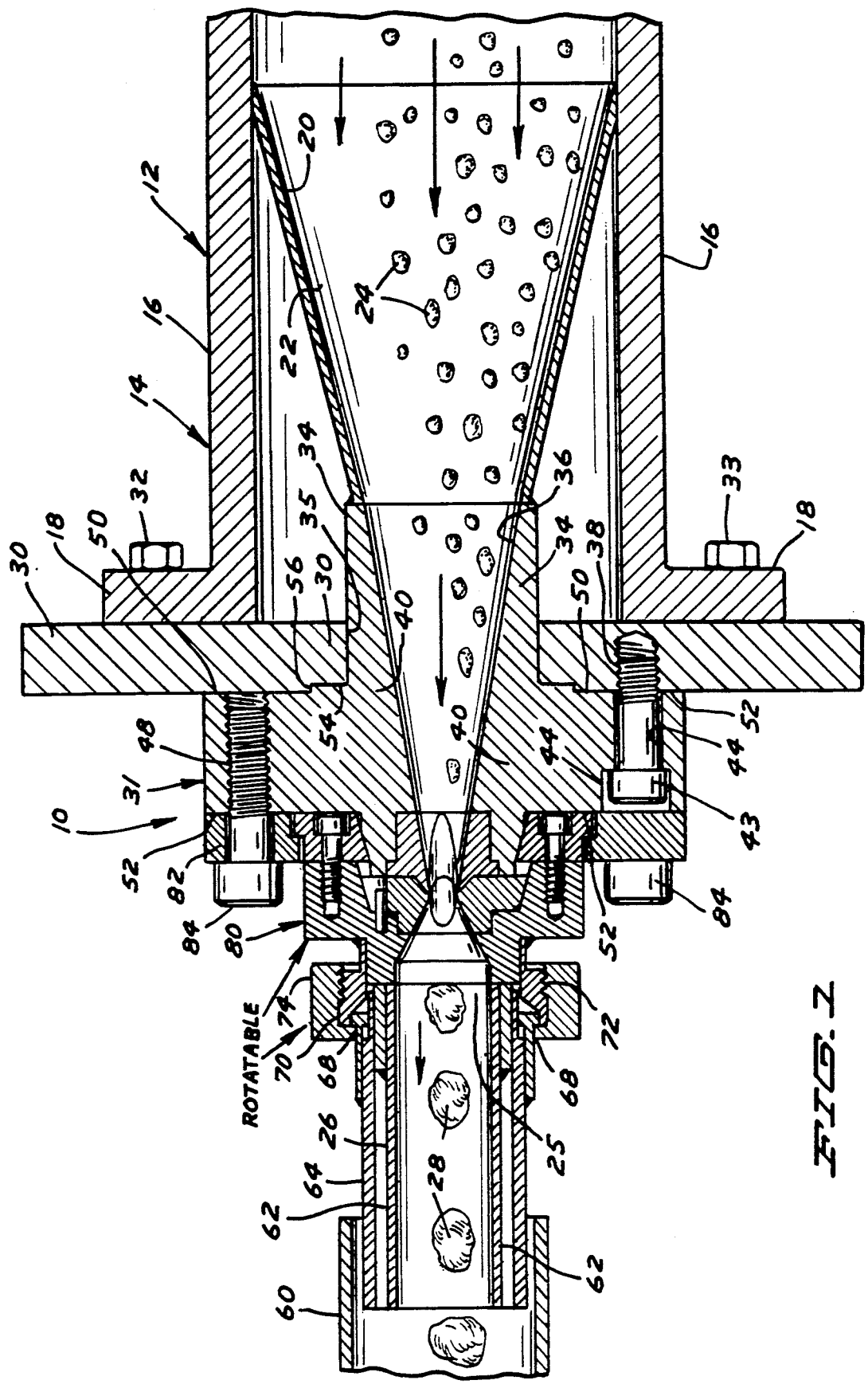
FIG. 1 is a cross-sectional view of an embodiment of the present exit nozzle showing material flow from right to left.

Reference is now made to the drawings and in particular to FIG. 1 which shows an embodiment of the present flow control assembly or nozzle designated generally by reference numeral 10. The nozzle 10 is of the convergent-divergent narrow throat type. The nozzle 10 depicted is shown functioning as an exit nozzle for an R-T-E cereal gun puffing apparatus 12. However, only a discharge end 14 of the gun puffing apparatus is shown in FIG. 1.

The discharge end 14 of the puffing gun functions as an inlet pipe to the nozzle 10 and includes a cylindrical puffing gun barrel 16 provided with an attachment means for removably operatively connecting the nozzle 10 to the gun 12. It is to be appreciated that the discharge barrel may in operation be rotating such as at rotational speeds of about 50 to 70 rpm or stationary depending upon the particular gun puffing apparatus and may be at an angle relative to horizontal. As shown, the means for mounting the nozzle 10 onto the puffing gun can include fabricating the barrel 16 with a flange 18 and a mounting plate 30 secured to the flange 18 in conventional manner such as with fastener bolts 32 and 33. The mounting plate 30 is further fabricated with a circular annulus 35 and a plurality of threaded bores (not shown) through which bolts such as bolt 32 and 34 which upon tightening operatively connect the nozzle to the gun discharge barrel 16. Of course, if desired, an "O" ring seal or gasket (not shown) can be positioned between the flange 18 and mounting plate 30. The discharge end 14 further includes a frusto-conically shaped convergent piece or barrel exit portal 20 positioned within the barrel 16 for constricting the cross-sectional area to the flow of a heterogeneous fluid flow 22 to direct the flow 22 to the nozzle 10. The fluid 22 comprises a mixture of processing fluid media, e.g., steam (not shown) and cereal pellets 24 or half-products. The fluid flow depicted is from right to left and thus define "outward" or "forward" as generally being to the left as depicted in the drawings and "inward" or "rearward" being to the right and "exterior" and "interior" as being relatively further or closer to fluid flow, respectively. Generally, the pressure within the discharge pipe 16 ranges from about 30 to 130 psia and typical temperatures of 250° to 500° F.

In FIG. 1 it can be seen that the nozzle 10 further includes a generally cylindrical nozzle stationary (relative to the puffing gun barrel) subassembly 31 comprising a rugged base flange 40 having an annulus 42 concentric with the axis of fluid flow and barrel 16. The base flange 40 has a plurality (e.g., eight) of larger smooth bores 44 aligned with the threaded bores 38 in the mounting plate 30. The base flange 40 is secured to the mounting plate 30 and the nozzle 10 operatively connected to the puffing gun 12 by a plurality of recessed hex-headed bolts 45 which are removably tightened into the plate threaded bores 38. The base flange 40 further includes a plurality (e.g., four) of threaded bores such as bores 46 and 48 depicted. The base flange 40 has an inner face 50 and an outer face 52. If desired, the base flange 40 can be fabricated with a collar 54 on the inner face 50 adapted to engage a recess 56 in the outer face of the mounting plate 30 peripheral to the mounting plate annulus 35 which construction facilitates mounting of the nozzle 10.

In FIG. 1 it can be further seen that the nozzle stationary subassembly 31 further includes a means for feeding the fluid flow 22 to valve flow control members as described below such as an inlet tube 34 having a concentric (to the axis of fluid flow), i.e., axially aligned and extending, convergent conically shaped bore 36 positioned within the annulus 42 and which is welded to the base flange 40. The inlet tube 34 and the mounting plate annulus 35 are selectively sized so that inlet tube 34 can slidably engage the mounting plate 30 through its annulus 35 for easy mounting and dismounting for cleaning and the inlet tube 34 operatively connects with the exit portal 20 to provide a continuously convergent passageway.

In FIG. 1, it is still further seen that at its discharge end, the present nozzle 10 is operatively connected to the inlet end 25 of a collection subassembly 26 only a portion of which is depicted in FIG. 1. Within the collection subassembly 26, the steam is being introduced into a zone of lower pressure relative to the gun discharge barrel 16, e.g., atmospheric pressure. As a result, the moisture within the cereal pellets flash vaporizes causing a rapid expansion of the cereal pellets forming puffed R-T-E cereal pieces 28. The puffed cereal pieces 28 are conveyed by the steam through the collection subassembly 26 and are ultimately discharged to a receiver or separator (not shown) within which the puffed pieces 28 are separated from the steam. The collection subassembly 26 includes an exit pipe 60 positioned within which is a discharge pipe 62 optionally having a surrounding muffler 64. More particularly, at its inner end, the discharge pipe 62 includes a means for operatively connecting the discharge pipe 62 to the nozzle 10 such as sanitary fitting 66 including a male member 68 welded to the discharge pipe 64 and a matching female member 70 welded to the nozzle 10. The female member 70 includes exterior threads 72. The discharge subassembly 26 includes a large nut 74 which engages the threads 72 and upon tightening secures the collection subassembly 26 to the exit end of the nozzle 12.

Still referring to FIG. 1, it can be seen that the nozzle 10 further comprises an inner valve subassembly 80 mounted on and operatively connected at its inner end to the valve stationary subassembly 31 and to the collection subassembly 26 at its other outer end. Intermediate the inner valve subassembly 26 and the valve stationary subassembly 31 is a high temperature seal such as a hollow "O" ring 81 fabricated from stainless steel.

Figure 2:
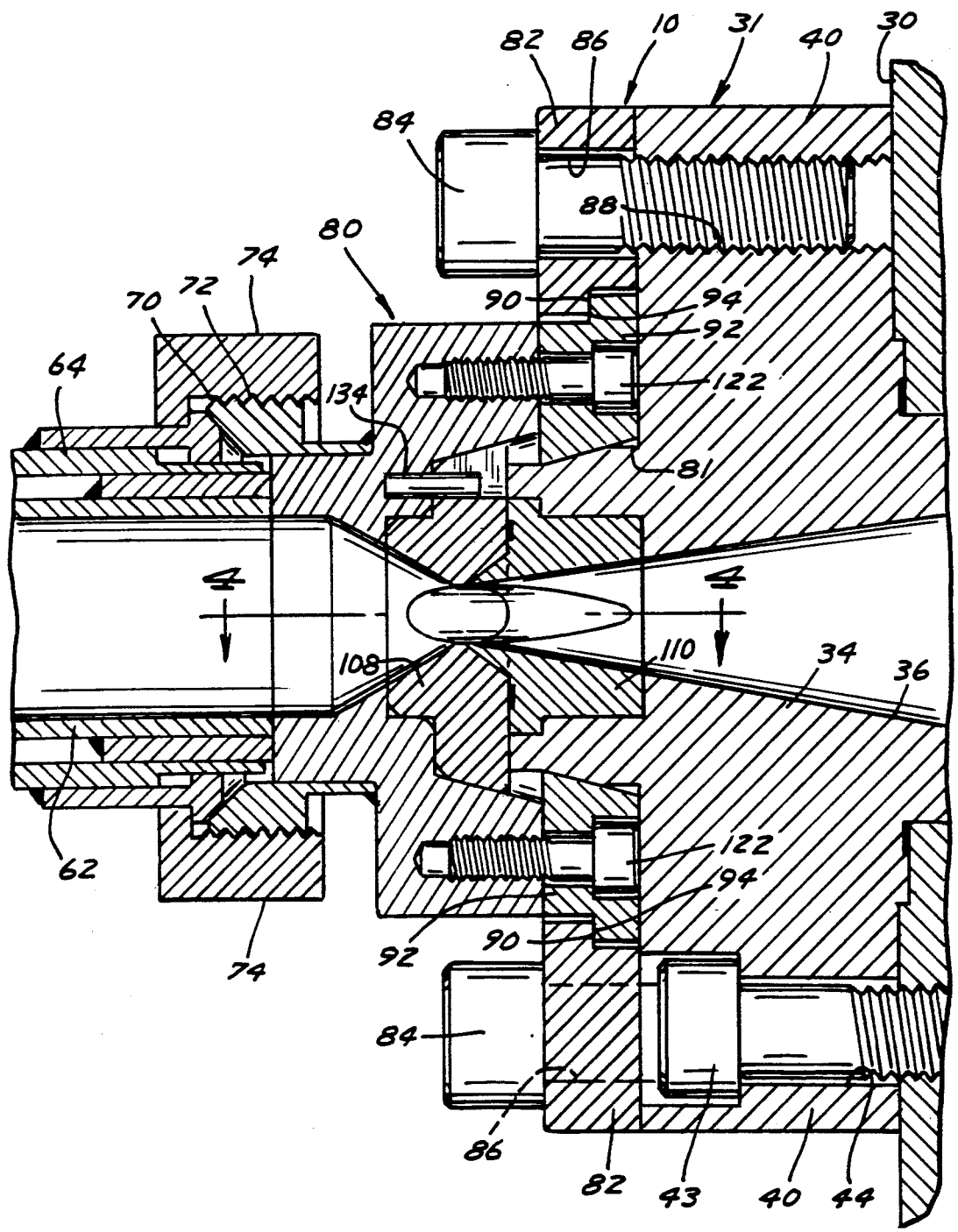
FIG. 2 is an enlarged cross-sectional view of a portion of the exit nozzle similar to FIG. 1 but without the depicted fluid flow.

Reference now is briefly made to FIG. 2 which is an enlarged view of the operative portion of the nozzle 10 shown without the fluid flow and which shows the inner valve subassembly 80 operatively connected to the valve stationary subassembly 31. There it can be seen that the nozzle 10 further includes a means for operatively mounting the inner valve assembly 80 onto the valve stationary subassembly 31 which is shown as including a first outer larger retaining ring 82 secured to the base flange 40 such as with bolts 84, e.g., four, through smooth bore holes 86 in ring 82 screwed into matching, aligned threaded bore holes 88 in the base flange 40. The outer retaining ring 82 can include an inner peripheral, concentric shoulder 90. The operative mounting means further comprises equipping the inner nozzle subassembly 80 with a second inner retaining ring 92 which is fabricated with a matching internal peripheral concentric shoulder 94 which engages the shoulder 90. It will be appreciated that this engagement can be tightened or loosened to allow rotation of the inner valve subassembly 80 around the stationary flow control piece 110 as described below thereby making flow control piece 108 "adjustable" relative to the "stationary" flow control piece 110.

Figure 4:
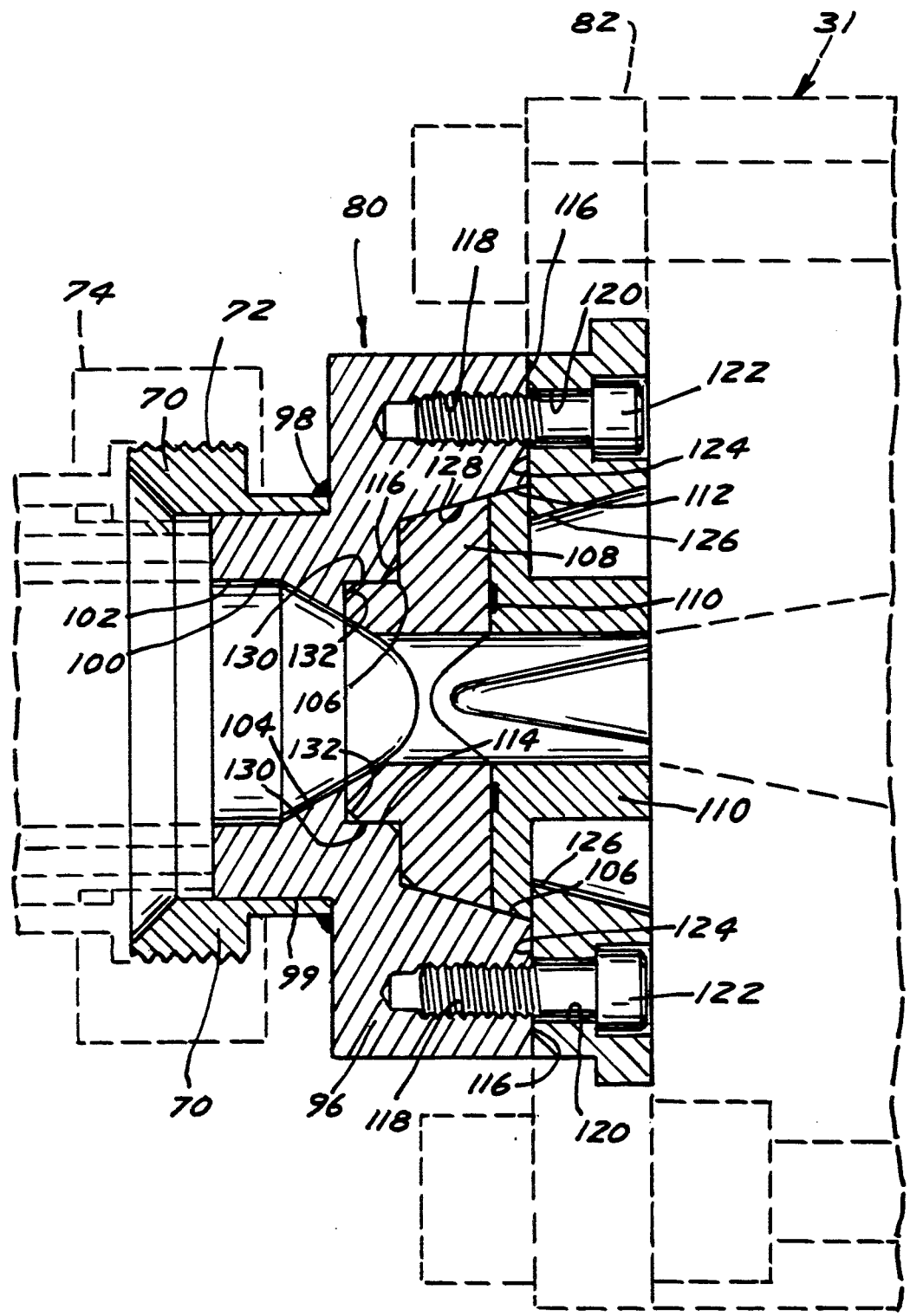
FIG. 4 is a top sectional view of the inner nozzle subassembly taken along lines 4—4 of FIG. 2.

Reference is now made to FIG. 4 which shows a top cross-sectional view of the inner valve subassembly 80. The inner nozzle assembly 80 comprises a cylindrical, axially aligned cap base piece 96 onto which the female piece 72 of the sanitary discharge fitting is affixed such as by weld 98. The cap base 96 further includes an outer peripheral cylindrical surface 99 and a concentric or axially extending exit bore 100 which bore includes an outer cylindrical portion 102 and an inner divergent frusto-conically shaped portion 104. The cap base piece 96 further includes an inner cavity 106 adapted to retain two valve flow control pieces including an outer axially aligned "adjustable" valve control piece 108 and an inner "stationary" control piece 110 which are described in further detail below. The cavity or inner bore 106 includes a larger inner convergent, concentric frusto-conically shaped portion 112 and a second concentric cylindrical portion 114 conveniently of the same diameter as the outer cylindrical bore portion 102 which together define a shoulder 116.

Still referring to FIG. 4, it is seen that the inner valve subassembly includes a means for retaining the valve control pieces 108 and 110 within the cavity 106 such as fabricating the cap base 96 on its inner face 116 with a plurality of threaded bore holes 118, e.g., four, which are aligned with matching, recessed headed bore holes 120 fabricated in the inner retaining ring 92 and through which are bolts 122 which upon tightening secure the retaining ring to the cap base 96. The inner retaining ring 92 has an outer face 124 which is larger than and is in confronting relationship to cap base inner face 116 thereby defining an inwardly projecting shoulder 126 which frictionally engages the inner flow control piece 110 to thereby secure the piece 110 within the cap base 106.

Still referring to FIG. 4, it can be seen that the flow control pieces 108 and 110 each nest with each other and both within the cap base cavity 106 and have an intermediate seal "O" ring 110. The outer control piece 108 is fabricated with an outer peripheral surface 128 having a matching frusto-conical shape adapted to meet smoothly the frusto-conical portion 112 of the inner cap base bore. Similarly, the outer control piece 108 has an inner, mating cylindrical peripheral surface 130 adapted to meet smoothly the cylindrical portion 114 of the cap base inner bore and which thereby defines an outer shoulder 132. To facilitate assembly, cap base shoulder 106 and outer flow piece shoulder 132 can be cambered to remove their sharp edges as depicted.

Referring now briefly to FIG. 5, it can be seen that inner nozzle subassembly 80 can further include a means for indexing the rotation of the outer flow control piece 108 relative to the cap base 96 such as fabricating the cap base with an indexing pin 134 friction fitted therein which pin 134 engages a pin slot 136 fabricated in the outer flow control piece 108. The cap base outer cylindrical surface 131 can include a calibration feature (not shown), e.g., scale showing degrees of rotation. Thus, as the cap base 96 is rotated, (see FIG. 5) then the "adjustable" outer flow control piece 108 is correspondingly rotated to adjust the orifice area as described in further detail below.

Figure 3:
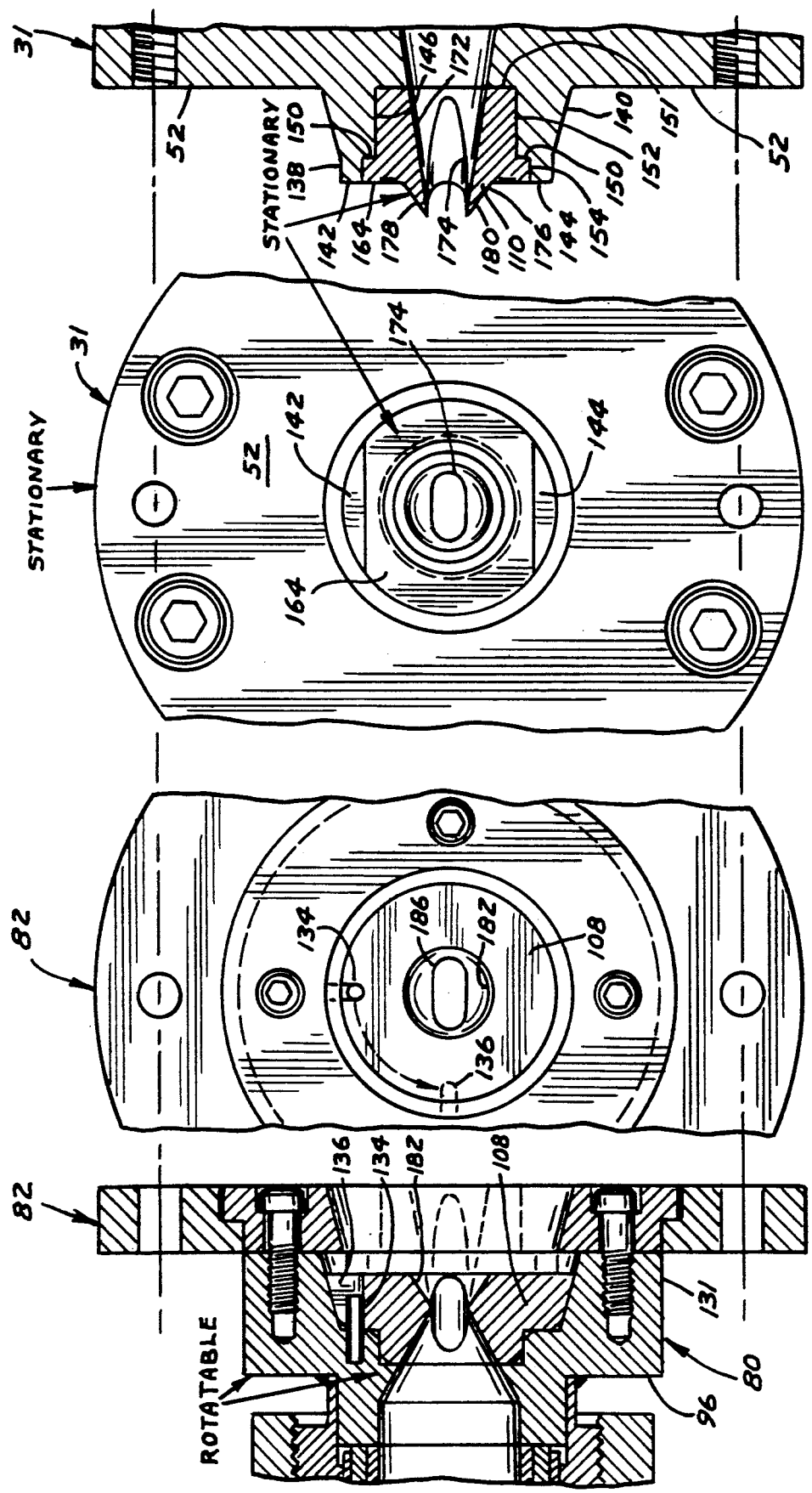
FIG. 3 is a cross-sectional view partially cut away of the valve stationary subassembly with the inner nozzle subassembly removed but including the inner flow control member and including a plan view of the valve stationary subassembly.

Referring now briefly to FIG. 3 which shows the stationary valve assembly 31, it can be seen that the inner flow control piece 110 nests at its inner end in the stationary valve subassembly 31. Piece 110 is shown for illustration purposes even though piece 110 is not a component of the stationary valve assembly 31. More particularly, the base flange 40 includes a means for preventing rotational movement of the inner valve control piece 110 relative to the discharge pipe 26 which can include a cylindrical mandrel 138 projecting outwardly from the base flange outer face 52 having an outer indexing slot guide portion 140. The slot guide portion 140 includes an upper and lower straight laterally extending indexing slots 142 and 144 and a cavity having an inner smaller cylindrical concentric bore portion 146 and an outer larger cylindrical concentric bore portion 148 thereby defining first and second internal shoulders 150 and 151 and the slots 142 and 144.

Still referring to FIG. 3, it can be seen that the inner flow control piece 110 has a complex shape including an inner smaller exterior cylindrical surface 152 having a diameter approximately the diameter of smaller cylindrical bore portion 146. Reference is now made briefly to FIG. 7 and 9 which shows that the flow control piece 110 has an outer flange 154 having an opposed pair of arcuate portions 156 and 158 and an opposed pair of planar portions 160 and 162 as well as outer perpendicular face 164. In FIG. 3, it is seen that the planar portions 160 and 162 are in confronting relationship with slots 142 and 144 respectively. When the inner control piece 110 is thus nested in the slot guide portion 140, the control piece 110 is then stationary relative to (i.e., rotationally fixed) to the stationary valve subassembly 31 and thus in turn stationary relative to the puffing gun's discharge barrel 16 although the barrel may be rotating as described above.

Reference is now still made to FIG. 3. The inner flow control member 110 is shown to have an axially extending internal passageway 170 which has a complex shape. The passageway 170 has both an interior convergent axially aligned bore cut 172, e.g., frusto-conical, as well as an ellipsoid bore cut 174 which may be either concentric or eccentric. In more preferred embodiments, the long axis of the ellipsoid bore cut 174 is parallel to the plane of planar portions 160 and 162. The flow control member further essentially comprises a first exterior mating surface 176 projecting outwardly from the flow member outer surface 164. The mating surface 176 is at an oblique angle, i.e., an angle other than 90° from the direction of flow so as to form and provide the mating surface 176 as an exterior frusto-conical surface such as the acute angle (about 45°) depicted. The combination of 1) interior convergent bore cut 172, 2) ellipsoid bore cut 174, and 3) exterior frusto-conical mating surface 176 together form a pair of lips including upper lip 178 and lower lip 180 shown. The mating surface 176 can have an acute angle of declination to axis of flow greater or lesser than that depicted which is about a 45° cone. In another variation, the surface 176 may be parabolic, i.e., curved rather than the cone shape depicted, i.e., straight.

Reference is now made to FIGS. 6 and 8 which show the outer flow control member 108 in isolation. Member 108 has an inner perpendicular surface 180 which is in confronting relationship to outer perpendicular surface 164 of the inner control member 110. Outer flow control member 108 is fabricated with an axially extending internal passageway 182 also having a complex shape. Passageway 182 is defined in part by a second mating surface 184 to mating surface 176, that is, frusto-conical, matching the diameter and angle of declination of surface 176. By virtue of the matching surfaces 184 and 176, flow control piece 108 and flow control piece 110 nest together and flow control piece 108 is freely rotatable relative to flow control piece 110.

Still referring to FIGS. 6 and 8, it can be further seen that passageway 182 is further partially defined by a ellipsoidal frusto-conical bore cut 186 corresponding to the bore cut 174 in flow control piece 110. Now referring briefly back to FIG. 5, it can be seen that the outer flow control piece 108 further essentially includes and is partially defined by an ellipsoid bore cut 186 which is preferably concentric to the axis of flow, although the bore cut 186 in other embodiments can be eccentric.

When assembled, the two control flow pieces importantly form a passageway having no surface perpendicular to the flow of the steam and pellets upon which the pellets can impinge. By such a construction, not only is R-T-E cereal piece damage minimized, but also the potential for blockage is substantially reduced. Blockage potential is reduced because no surface exists upon which cereal pellet pieces or fragments can impinge and/or accumulate. Accordingly, the present nozzle design provides significant improvements, not only in finished product quality by reducing damaged pieces, but the design also provides increases in operating time performance by reducing the potential for blockage compared to other adjustable nozzles.

Reference is now made to FIGS. 10-13. As the outer flow control member 108 (not shown) is rotated relative to flow control piece 110 (not shown), it can be seen that the open orifice area can be controlled. In FIG. 10, the maximum orifice area is obtained corresponding to a fully open nozzle position. Such an open condition is obtained when the flow control pieces 108 and 110 are mated when in the relative orientation depicted in FIGS. 8 and 9. FIGS. 11 and 12 show reduced orifice areas as flow control member 108 is rotated relative to flow control piece 110 as directionally depicted in FIG. 8. The minimum orifice area is depicted in FIG. 13. Such a maximally restricted condition is obtained when the flow control piece 108 is rotated relative to flow control piece 110 a full 90° as depicted in FIGS. 6 and 7. The skilled artisan will appreciate that minor modifications in the size, shape and eccentricity of the bore cuts in the flow control piece members can result in flow control assemblies having a closed orifice area so as to function as a flow valve without departing from the spirit of the present invention.

As pointed out above, the apparatus herein described can be used to puff a variety of puffable materials. As disclosed in U.S. Pat. No. 3,231,387, the puffing gun can be operated under a variety of different operating conditions. It has been found that in practicing the present invention, the same general processing conditions as those disclosed in the above patent can be used. Steam is preferably used as the processing fluid, and it is introduced into the gun barrel at a pressure broadly ranging from about 30 to 130 psig and at a temperature ranging from about 250° to 500° F. It should be recognized, of course, that pressures and temperatures outside these ranges might also be used if desired for certain products and under certain operating conditions; the above ranges merely define certain ranges which have been found to work with good results for puffable materials such as rice, corn, and cereal dough pieces. The barrel is maintained at a temperature of about 500° to 900° F., and it is rotated at a speed of about 28 to 100 rpm, it is inclined at an angle of about 2-½ to 4 degrees with respect to a horizontal plane, and its length can vary within quite wide ranges; guns having a length of 10 to 20 feet and a diameter of 8 to 10 inches, for example, have been used. Fixed nozzle sizes having diameters ranging from about ½-21/32 inch have been used with good results. Under normal operating conditions, material to be puffed is fed into the inlet end of the gun at a feed rate of about 5 to 50 pounds per minute, its moisture content might range from about 5% to 15%, and preferably it is preheated to a temperature ranging from about 100° to 200° F., although this may not be necessary or desired in all instances. Generally, the material is maintained in the gun barrel for about 5 to 75 seconds, during which time the starch within the material is at least partially gelatinized, and in many instances, complete gelatinization is achieved.

While the present invention finds particular suitability for use in connection with the flow control of heterogeneous flow streams, e.g., fluid, (whether liquid or gaseous) suspensions of solid particulates, the skilled artisan will appreciate that the present nozzles can also be used for homogeneous fluid flow control, e.g., gases or fluids. The present nozzles are especially useful in hostile environments where durability is required. Another advantage is that the present nozzles exhibit excellent wear resistance, especially against abrasion due to absence of surfaces normal to fluid flow.

What is claimed is:

1. A flow control device of rugged construction of the convergent-divergent type suitable for use as a discharge nozzle for ready-to-eat cereal gun puffing apparatus and having a variable orifice area, comprising:
   A. an inner valve subassembly comprising
      1. a cylindrical valve base having an axially aligned and extending passageway having an inlet and thereby defining a longitudinal axis, an outlet end and a first relatively larger cylindrical portion proximate the inlet end thereby defining a cavity;
      2. an inner and an outer flow control member in confronting relationship disposed within the cavity, wherein said outer flow control member is axially rotatable relative to said inner flow control member, wherein each said inner and outer flow control members having an axially aligned and extending passageway and wherein the inner and outer flow control members have opposed mating surfaces at least a portion of each mating surface proximate the passageway meet at an interface having an angle that is oblique to the longitudinal axis, said inner flow control passageway having inner and outer ends having both a first circular or ellipsoid bore cut and a second convergent frusto-conical bore cut and said outer flow control passageway having a circular or ellipsoid bore cut and an outer divergent portion and an inner portion defined by it oblique mating surface; and
      3. a first means for retaining an inner and outer flow control piece within the cavity.
      4. a first attachment means formed on the valve base for removably attaching the base to the discharge end of the gun puffing apparatus; and wherein the device further includes
   B. a stationary valve base subassembly upon which the inner valve subassembly is removably mounted, said valve base subassembly including
      1. a base flange having an axially aligned convergent passageway having inner and outer ends, said outer end meeting with the inner end of the outer flow control member passageway to form a continuously convergent passageway, said base flange having an opposed pair of inner and outer faces perpendicular to the longitudinal axis;
      2. a second attachment means formed on the base flange for removably attaching the base to an inlet pipe;
      3. a second means for removably retaining the inner valve subassembly onto the stationary valve base.

2. The flow control device of claim 1, wherein the mating surfaces of the inner and outer flow control members have at least a portion of each at an acute angle to the longitudinal axis thereby forming a convergent frusto-conical surface in the inner portion of the passageway in the outer flow control member.

3. The flow control device of claim 2, wherein the inner valve subassembly further includes a means for preventing the rotation of the inner flow control member, wherein the inner valve subassembly further includes a means for indexing the outer flow control member relative to the valve base.

4. The flow control device of claim 3, wherein the first bore cut in the inner flow control passageway is an ellipsoid, and wherein the first bore cut in the outer flow control passageway is an ellipsoid.

5. The flow control device of claim 4, wherein the first and second bore cuts of the inner flow control passageway are concentric with the longitudinal axis, wherein the first bore cut of the outer flow control passageway is concentric with the longitudinal axis.

6. The flow control device of claim 5, wherein in the stationary valve subassembly the means for preventing the rotation of the inner flow control member includes a mandrel projecting outwardly (and axially concentric to the passageway) from the exterior perpendicular face of the base flange, said mandrel terminating at its outward end with a slot for engaging the inner control flow member, said slot being defined by an upper and lower indexing slots defining an upper and lower interior shoulders; and wherein the inner flow control member has an outer perpendicular flange for engaging the slot, said flange having an outer face and an inner face, an opposed pair of arcuate portions and planar portions wherein the planar portions engage the upper and lower indexing slots and wherein the inner flange face abuts against the upper and lower mandrel interior shoulders.

* * * * *